United States Patent
Vuong et al.

[11] Patent Number: 6,115,072
[45] Date of Patent: Sep. 5, 2000

[54] 16:9 ASPECT RATIO CONVERSION BY LETTERBOX METHOD FOR AN MPEG IMAGE

[75] Inventors: Bao Vuong, San Diego; Candace Anderson, Rancho Santa Fe, both of Calif.

[73] Assignees: Motorola, Inc., Schaumburg, Ill.; General Instrument Corporation, Horsham, Pa.

[21] Appl. No.: 09/238,958

[22] Filed: Jan. 27, 1999

[51] Int. Cl.[7] ........................................ H04N 7/01
[52] U.S. Cl. ............................. 348/445; 348/913
[58] Field of Search ..................... 348/445, 556, 348/558, 416, 913, 441, 714, 716, 718

[56] References Cited

U.S. PATENT DOCUMENTS

| | | |
|---|---|---|
| 4,953,025 | 8/1990 | Saitoh et al. . |
| 5,475,442 | 12/1995 | Matsushita et al. ............... 348/445 |
| 5,534,934 | 7/1996 | Katsumata et al. . |
| 5,638,130 | 6/1997 | Linzer . |
| 5,675,387 | 10/1997 | Hoogenboom et al. . |
| 5,793,434 | 8/1998 | Lee . |
| 5,825,424 | 10/1998 | Canfield et al. ................... 348/445 |
| 5,832,124 | 11/1998 | Sato et al. ........................ 348/445 |
| 5,881,205 | 3/1999 | Andrews et al. ................... 348/913 |
| 5,912,710 | 6/1999 | Fujimoto .......................... 348/445 |
| 5,926,613 | 7/1999 | Schaffer ........................... 348/445 |

*Primary Examiner*—Victor R. Kostak
*Attorney, Agent, or Firm*—Barry R. Lipsitz; Ralph F. Hoppin

[57] ABSTRACT

A method and apparatus for converting a digital video image to a higher aspect ratio format at a decoder by line dropping. For example, conversion from a 4:3 to a 16:9 letterbox format may be achieved. Line dropping for non-anchor pictures (e.g., B-pictures) occurs on a decoding-side of the decoder, prior to storage in memory. Line dropping for anchor pictures (e.g., I- and P-pictures) occurs on a display-side of the decoder, after being retrieved from the memory, and prior to display. Additional memory space is freed to allow storage of additional decoded data, thus compensating for the decrease in display processing time caused by a reduced number of active video lines that are processed with the letter box format.

16 Claims, 3 Drawing Sheets

16:9 ASPECT RATIO CONVERSION BY LETTERBOX METHOD FOR AN MPEG IMAGE

BACKGROUND OF THE INVENTION

The present invention relates to a method and apparatus for converting a digital video image to a higher aspect ratio format at a decoder by line dropping. The invention is particularly suitable for use with digital video data corresponding to the MPEG-2 standard.

The transmission of digital video data via broadband communication systems such as cable television or satellite television networks has become increasingly popular. Digital decoders, e.g. set-top boxes, are provided in consumers' homes for use in receiving the digital video signals and processing the signals in a format that is suitable for display on a television, video display terminal, or the like. However, the processing and memory storage requirements of such set-top boxes is significant and must be kept as low as possible in order to maintain the commercial feasibility of the network.

In particular, in many cases it is desirable to provide a capability at the decoder for converting a digital video image having an aspect ratio, e.g., 4:3, that is sized for conventional television screens, to a higher aspect ratio, e.g., 16:9. A 16:9 aspect ratio is commonly used for filming motion pictures that are intended to be shown on screens in movie theaters. This aspect ratio allows a greater range of horizontal motion in the image.

However, the 4:3 aspect ratio has prevailed in television screen design and frame formats in the existing television transmission standards, including Phase Alternation Line (PAL) and National Television System Committee (NTSC). Accordingly, to display a conventional NTSC or PAL signal in a 16:9 format on a television screen, the image appears with black regions above and below the active video lines.

Moreover, decompression of digital video signals, such as those conforming to the MPEG-2 standard, requires the use of an external memory, such as Dynamic Random Access Memory (DRAM), to provide frame buffers for the different picture types (e.g., I-, P- and B-pictures), and to provide a Video Buffer Verifier (VBV) buffer. The buffer arrangement is generally optimized for handling the MPEG-2 Main Profile at Main Level requirement. The MPEG-2 standard also requires the VBV buffer to be at least 1.75 Mbit. With these limitations, and the memory arrangement existing in current video decompression processors, there is no additional memory space or memory bandwidth available to support 16:9 aspect ratio conversion by letterbox at a decoder.

Accordingly, it would be desirable to provide a system for converting the aspect ratio of a digital video image at a decoder without requiring additional memory space or memory bandwidth. The system should be compatible with existing digital video standards, including MPEG-2, and existing television transmission formats, including PAL and NTSC.

In a particular embodiment, the system should provide an architecture and methodology which uses only a 16 Mbit EDO DRAM operating at 27 MHz (with a 32-bit data bus), or a SDRAM operating at 54 MHz (with a 16-bit data bus) for converting a 4:3 aspect ratio image to a 16:9 aspect ratio image. However, the system should provide other conversions to larger aspect ratios as required.

The system should be compatible with both field mode (e.g., interlaced scan) and frame mode (e.g., progressive scan) video.

The present invention provides a system having the above and other advantages.

SUMMARY OF THE INVENTION

The present invention relates to a method and apparatus for converting a digital video image to a higher aspect ratio format at a decoder by line dropping.

In accordance with the present invention, line dropping for non-anchor pictures occurs on the decoding-side of the decoder, prior to storage in memory, while line dropping for anchor pictures occurs on the display-side of the decoder, after being retrieved from the memory, and prior to display. The present invention therefore can provide an aspect ratio conversion capability without requiring additional memory space or bandwidth that would otherwise be required due to the increased delay between decoding time and display time incurred with letterbox aspect ratio conversions. This increased delay is caused by a decrease in display processing time since the number of active video lines that must be processed is reduced with the letter box format. Therefore, additional memory space must be freed to allow storage of additional decoded data to avoid data under runs to the display. The present invention achieves this goal.

A particular method for changing the aspect ratio of digital video images, where each image has several video lines, includes the step of (a) determining the picture types of the digital video images received at a decoder, where the picture type is an anchor image, such as an I- or P-picture, or a non-anchor image, such as a B-picture. In a step (b), lines are dropped from the non-anchor images prior to storing the associated data in a memory. In a step (c), data associated with the anchor images is stored in the memory, e.g., without line dropping.

In a step (d), the data associated with the non-anchor images is retrieved from the memory for output to a display function, with no further line dropping. In a step (e), the data associated with the anchor images is retrieved from the memory, and lines are dropped prior to output to the display function.

Thus, the full anchor picture data is stored in the memory for use in decompressing subsequent and previous predictive-coded images. However, the invention takes advantage of the fact that the full non-anchor picture data need not be stored, thereby freeing additional memory space for accommodating the letterbox aspect ratio conversion.

The digital video images may be received at the decoder via a broadband communication network.

During the line dropping process mentioned above, every nth line is dropped from the non-anchor images in step (b), and every nth line is dropped from the anchor images in step (e). For example, for an aspect ratio conversion from 4:3 to 16:9, every fourth line is dropped.

A corresponding apparatus is presented.

DETAILED DESCRIPTION OF THE INVENTION

Figure 1:
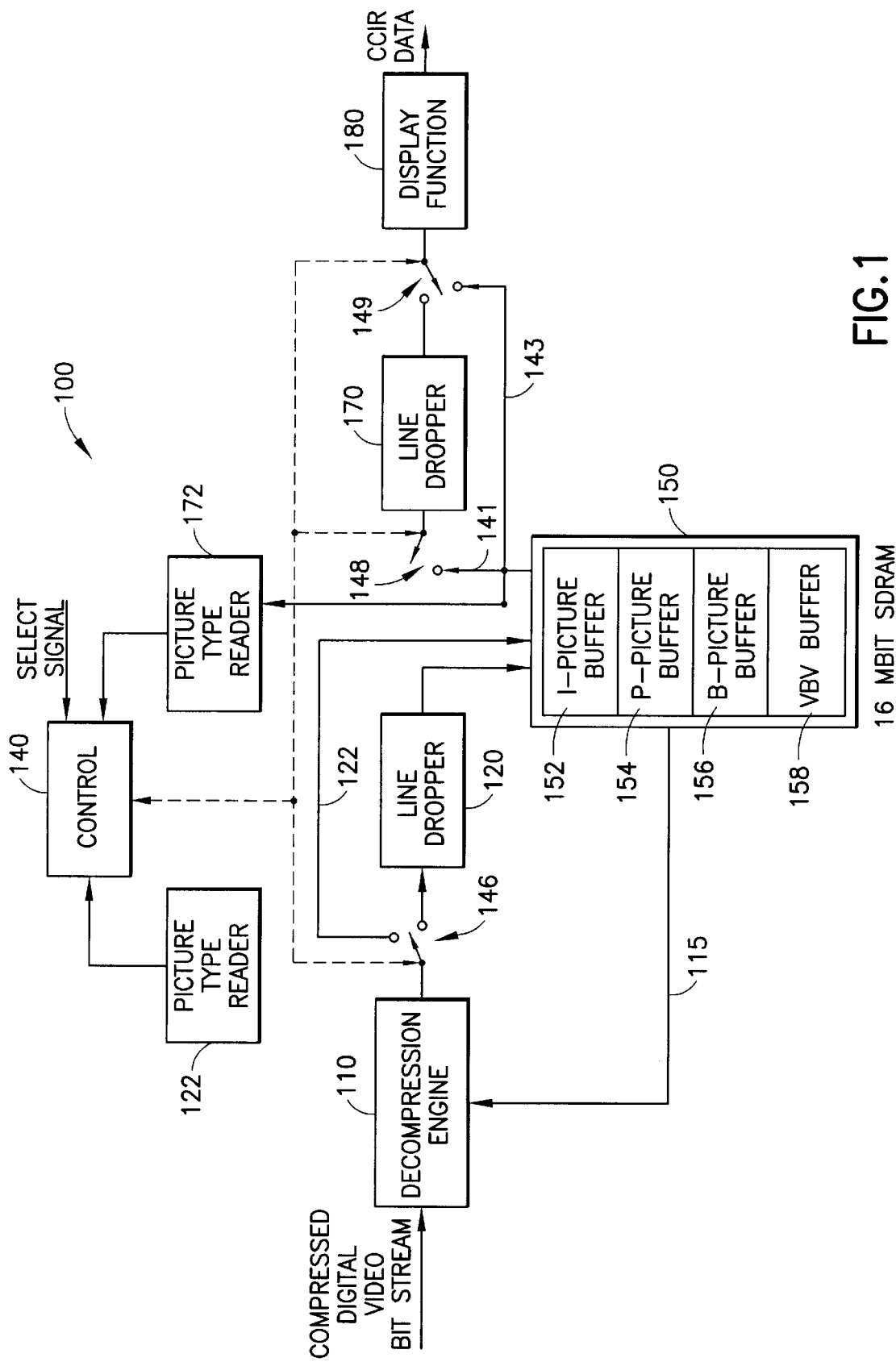
FIG. 1 illustrates a decoder in accordance with the present invention.

The present invention relates to a method and apparatus for converting a digital video image to a higher aspect ratio format at a decoder by line dropping.

As mentioned, MPEG-2 video decompression requires the use of an external memory, such as DRAM, for frame buffers, and a compressed video stream buffer (VBV buffer). For example, a 16 Mbit EDO DRAM running at 27 MHz may be used. Moreover, a frame buffer arrangement as described in U.S. Pat. No. 5,675,387 to C. Hoogenboom and B. Vuong, entitled "Method and Apparatus for Efficient Addressing of DRAM in a Video Decompression Processor," may be used. The buffer arrangement described therein is optimized for handling MPEG-2 Main Profile at Main Level requirements. In the disclosed scheme, decoding efficiency is improved by reducing the number of times that different rows of the DRAM must be addressed in order to retrieve prior video frame pixel data that is necessary to reconstruct a current video frame.

As is known, an I-picture refers to an intra-coded picture that can be decoded without referring to another picture, a P-picture refers to a forward predicted picture that can be decoded using the previous decoded I- or P-picture, and a B-picture refers to a bi-directionally predicted picture that can be decoded using the previous and next I- or P-decoded pictures. I- and P-pictures are therefore anchor pictures since they may be used as a reference to predict another picture. Moreover, an I-, P- or B- picture may comprise an entire frame, or only a portion of a frame. For example, Video Object Planes as known from the MPEG-4 standard are arbitrarily shaped images.

The term "anchor image" is used herein to denote any image (such as I- and P-pictures) that can be used for predicting another image, while the term "non-anchor image" is used to denote any image (such as a B-picture) that cannot be used for predicting another image. An anchor image need not actually be used for predicting another image. Moreover, the term "image" is used to include a frame of a progressive scan data sequence, a field of an interlaced scan data sequence, and arbitrary as well as rectangular or otherwise symmetric images.

For decoding 16:9 aspect ratio, or letter box, images, the display processing is about 25% faster than the processing for standard 4:3 aspect ratio images due to the smaller display image caused by the black regions that are displayed above and below the active video. This is a problem since the display time for a B-picture is typically about half a frame time from the time it is decoded. Moreover, a longer delay between decoding and display requires a larger B-picture buffer for storing the decoded pixel data prior to display. However, as mentioned, with conventional decoder memory configurations, there is no additional memory space available to accommodate this new requirement. Furthermore, the cost of adding additional memory is a problem, in particular, for mass produced decoders/set-top boxes that must be produced at the lowest possible cost.

Thus, if 16:9 aspect ratio conversion is attempted without the additional B-picture buffer space, a display under run can occur, wherein an undesirable errored image may be displayed to the viewer.

For PAL mode video data, a video decompression processor (VDP) has about half of the B-picture buffered. This is due to the MPEG-2 requirement of a 1.75 Mbit VBV buffer.

In accordance with the present invention, by line dropping on the decoding-side of a decoder for the non-anchor pictures (B-pictures), the 16:9 letter box mode can be implemented without the cost of additional memory space and bandwidth. For anchor-pictures (I- and P-pictures), line dropping occurs on the display-side of the decoder. Line dropping is also known as scaling by decimation.

FIG. 1 illustrates a decoder in accordance with the present invention. The decoder 100 includes a decompression engine 110 that receives a compressed digital video bitstream from a channel, such as from a cable or satellite broadband communication network. The decompression engine 110 performs conventional decompression functions, including variable length decoding, inverse quantization, an inverse spatial transformation, and motion compensation and estimation processing, as required.

For predictive-coded (e.g., inter-frame coded) pictures, such as P- and B-pictures, the decompression engine 110 retrieves prior and/or future image data from a memory 150 via line 115. The memory 150 may be a 16 Mbit SDRAM or EDO, for example, with allocated memory spaces for providing an I-picture buffer 152, a P-picture buffer 154, a B-picture buffer 156, and a VBV buffer 158. The decompression engine 110 provides the decompressed current picture data to a picture type reader 122, and to a switch 146.

The picture type reader 122 determines the picture type of the current picture (e.g., frame) by reading the appropriate header information of the current picture data, and provides this picture type information to a control 140. The control 140 may include a microprocessor or other hardware, firmware, and/or software element for receiving and processing the picture type information.

If the current picture is an anchor picture, such as an I- or P-picture, the control 140 sends a signal to cause the switch 146 to route the current picture data directly to the memory 150 via line 122, bypassing a decoding-side line dropper 120. However, if the current picture is a non-anchor picture, such as a B-picture, the control 140 sends a signal to cause the switch 146 to route the current picture data to the line dropper 120. The line dropper 120 may include a line counter function which can detect and count each line of the current image data. The line dropper 120 drops every nth line of the current image data prior to outputting the data to the memory 150. For conversion from a 4:3 aspect ratio to a 16:9 aspect ratio, every fourth line is dropped (since $1-\frac{4}{3}/\frac{16}{9}=\frac{1}{4}$).

The control 140 may be responsive to a select signal, e.g., that a user provides via a hand-held remote control or the like, or which is responsive to data carried in the data stream indicating that a different aspect ratio should be used for display.

In accordance with the present invention, the B-picture data is not used for prediction by the decompression engine 110, and therefore the full B-picture image need not be stored in the memory 150. However, the P- and I-picture data may be required for prediction by the decompression engine 110, and therefore this data is stored in full in the memory 150.

For example, for an NTSC image with an original resolution of 720 pixels×480 lines, line dropping of every fourth line will result in a displayed image having 360 lines. Similarly, for a PAL image having 720 pixels×576 lines, line dropping of every fourth line will result in a displayed image having 432 lines. Black pixels fill the areas above and below the active video lines.

Additionally, although conversion of an image from a 4:3 aspect ratio to a 16:9 aspect ratio has been discussed, the invention may provide other conversion formats by dropping fewer or more video lines.

On a decoding-side of the decoder 100, data stored in the memory 150 is output to a display function 180 to provide data that is suitable for display on a television or other device. The display function 180 formats the data for display in a known manner, e.g., according to the CCIR standard. Specifically, the picture type of the output data is determined by a picture-type reader 172, which communicates with the control 140. The picture type readers 122 and 172 may shared common components and need not be independent, but may be if desired.

Optionally, the picture type of each picture need only be determined once, prior to storage in the memory, by correlating the timing of the output and input pictures of the memory 150 using a suitable timing scheme. For example, the Presentation Time Stamp (PTS) and picture type of each picture may be read for each picture at the decoding-side of the decoder 100, and stored at the control 140. A clock and memory associated with the control 140 can correlate the picture type of the picture data output from the memory 150 on the display-side with the previously recorded information.

However, for illustration, the example decoder 100 of FIG. 1 independently determines the picture type of each picture that is output from the memory 150.

If the picture output from the memory 150 is a non-anchor picture, the control 140 causes switches 148 and 149 to route the data directly to the display function 180, bypassing a display-side line dropper 170. There is no need for further line dropping for the non-anchor frame data since the required line dropping has already occurred at the decoding-side line dropper 120.

However, if the output picture is an anchor picture, the control 140 causes a switch 148 to route the data to the display-side line dropper 170 via line 141 for line dropping of every nth line. The anchor picture data is then provided via switch 149 to the display function 180.

Note that the decoder configuration shown in FIG. 1 is an example only, and that the aspect ratio conversion of the present invention may be accomplished using a variety of hardware, color firmware and/or software configurations.

If no aspect ratio conversion is desired, the control 140 causes the switches 146, 148 and 149 to bypass the line droppers 120 and 170 at all times.

Figure 2:
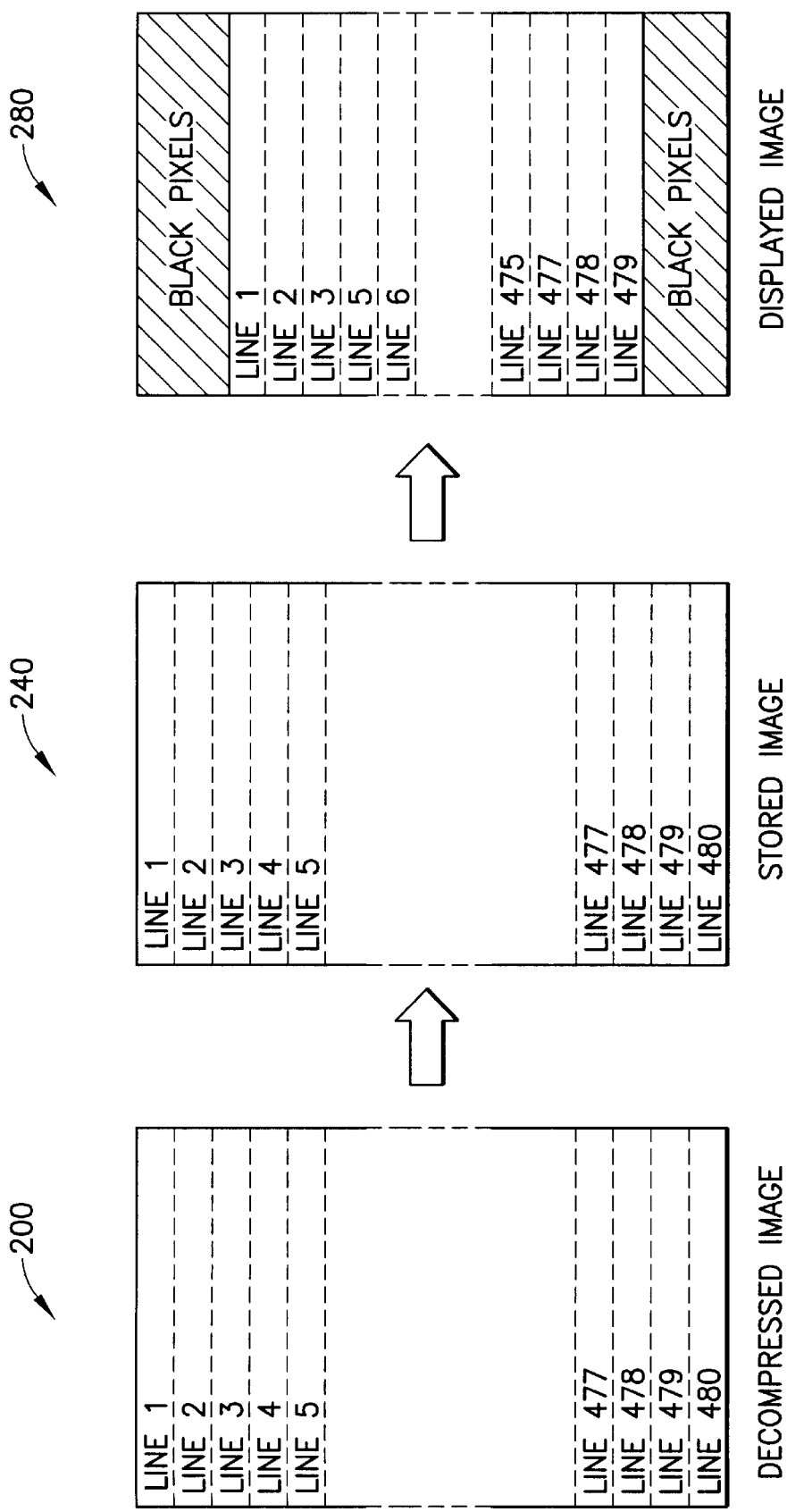
FIG. 2 illustrates processing of an I-picture or a P-picture in accordance with the present invention.

FIG. 2 illustrates processing of an I-picture or a P-picture in accordance with the present invention. For illustration, an NTSC image having 480 lines is assumed, although other television signals, such as PAL, may be used. Additionally, the aspect ratio is transformed from 4:3 to 16:9 in this example, although other aspect ratios may be used. The original, full decompressed image of the I-picture or P-picture 200 corresponds to the output of the decompression engine 110 of FIG. 1. The image 200 includes active video lines 1–480. Since line dropping has not yet occurred, the stored image 240, corresponding to the data in the memory 150 of FIG. 1, is the same as the full decompressed image 200.

The displayed image 280 shows the data output from the line dropper 170 of FIG. 1, where every fourth active video line has been dropped. Accordingly, there are only 360 lines in the displayed image 280, e.g., lines 1, 2, 3, 5, 6, . . . , 475, 477, 478 and 479. The last active video line of the image 280 corresponds to line 479 of the decompressed image 200. Black pixels are typically provided above and below the active video lines of the displayed image.

Figure 3:
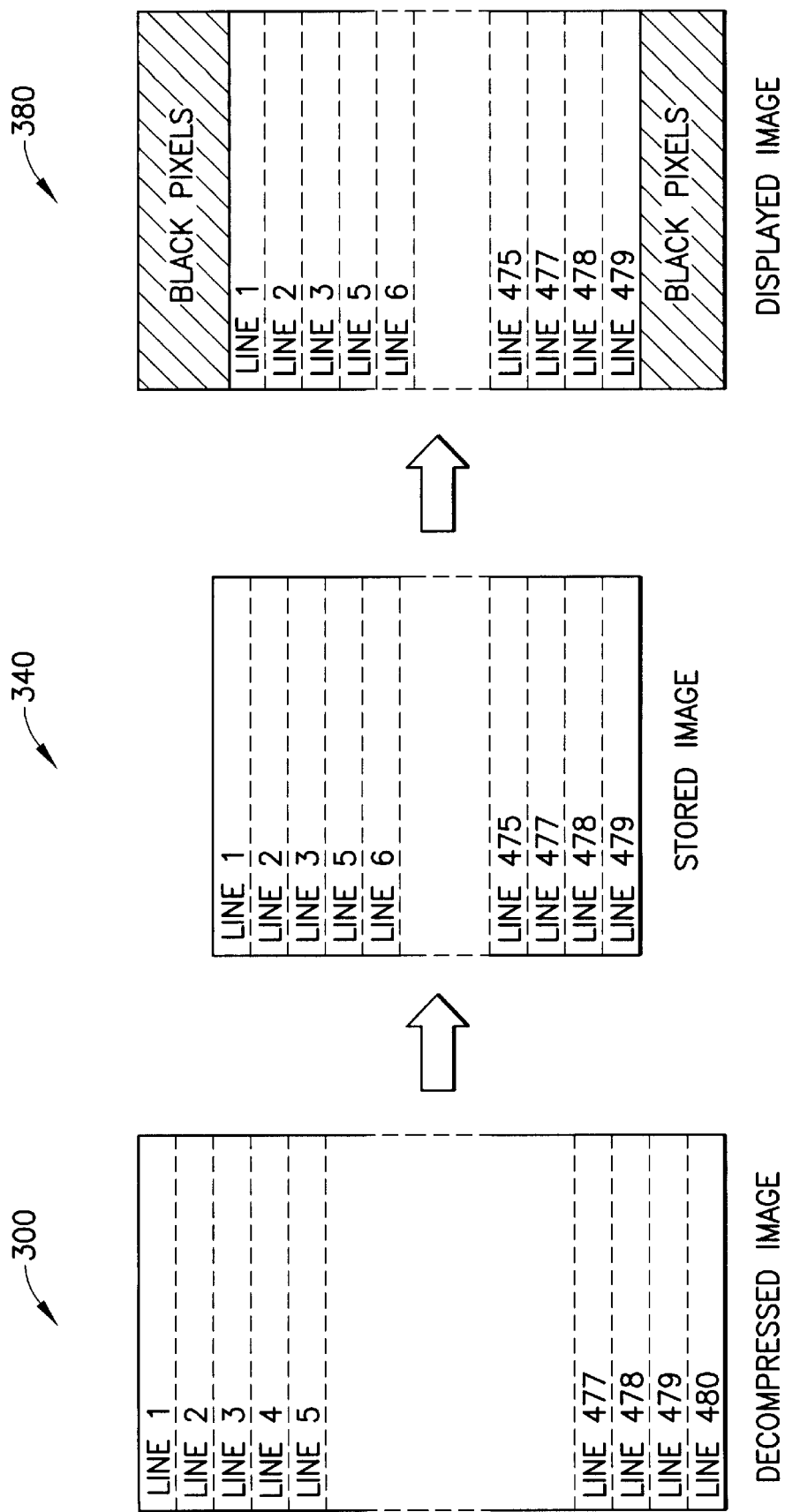
FIG. 3 illustrates processing of a B-picture in accordance with the present invention.

FIG. 3 illustrates processing of a B-picture in accordance with the present invention. The original, full decompressed B-picture image 300 includes lines 1–480. The stored B-picture image 340 corresponds to the data output from the line dropper 120 of FIG. 1. Accordingly, every fourth line of the image has been dropped. The displayed B-picture image 380 corresponds to the data on line 143 of FIG. 1, and includes a total of 380 lines for the NTSC video example discussed. Again, black pixels are provided above and below the active video lines in the displayed image 380.

Accordingly, it can be seen that the present invention provides a method and apparatus for converting a digital video image to a higher aspect ratio format at a decoder by line dropping. Line dropping for non-anchor pictures occurs on the decoding-side of the decoder, prior to storage in memory, while line dropping for anchor pictures occurs on the display-side of the decoder, after being retrieved from the memory, and prior to display.

The present invention therefore can provide an aspect ratio conversion capability without requiring additional memory space or bandwidth that would otherwise be required due to the increased delay between decoding time and display time incurred with letterbox aspect ratio conversions.

Although the invention has been described in connection with various specific embodiments, those skilled in the art will appreciate that numerous adaptations and modifications may be made thereto without departing from the spirit and scope of the invention as set forth in the claims.

For example, while the invention was discussed in connection with a cable or satellite television broadband communication networks, it will be appreciated that other networks such as local area networks (LANs), metropolitan area networks (MANs), wide area networks (WANs), internets, intranets, and the Internet may be used.

Additionally, the invention can be adapted for use with digital video standards other than MPEG-2, and television standards other than NTSC and PAL.

What is claimed is:

1. A method for changing the aspect ratio of digital video images, each comprising a plurality of video lines, comprising the steps of:
   (a) determining corresponding picture types of successive digital video images received at a decoder;
   said picture types including anchor images and non-anchor images;
   (b) dropping lines from the non-anchor images prior to storing data associated therewith in a memory;
   (c) storing data associated with the anchor images in the memory;
   (d) retrieving the data associated with the non-anchor images from the memory for output to a display function; and
   (e) retrieving the data associated with the anchor images from the memory, and dropping lines thereof prior to output to the display function.

2. The method of claim 1, wherein:
   the data associated with the anchor images is stored in the memory in said step (c) without dropping lines thereof.

3. The method of claim 1, wherein:
   the data associated with the non-anchor images is retrieved from the memory in said step (d) without dropping any further lines thereof.

4. The method of claim 1, wherein:
   said successive digital video images are received at the decoder via a broadband communication network.

5. The method of claim 1, wherein:
   said successive digital video images received at the decoder have an aspect ratio of 4:3; and
   the data output to the display function has an aspect ratio of 16:9.

6. The method of claim 1, wherein:

every nth line is dropped from the non-anchor images in said step (b); and every nth line is dropped from the anchor images in said step (e).

7. The method of claim 1, wherein:

said non-anchor images comprise bi-directionally predicted images.

8. The method of claim 1, wherein:

said anchor images comprise at least one of (i) intra-coded images, and (ii) forward predicted images.

9. An apparatus for changing the aspect ratio of digital video images, each comprising a plurality of video lines, comprising:

a picture type reader for determining corresponding picture types of successive digital video images received at a decoder;

said picture types including anchor images and non-anchor images;

a decoding-side line dropper for dropping lines from the non-anchor images prior to storing data associated therewith in a memory;

means for storing data associated with the anchor images in the memory;

means for retrieving the data associated with the non-anchor images from the memory for output to a display function; and means for retrieving the data associated with the anchor images from the memory, and a display-side line dropper for dropping lines thereof prior to output to the display function.

10. The apparatus of claim 9, wherein:

the data associated with the anchor images is stored in the memory without dropping lines thereof.

11. The apparatus of claim 9, wherein:

the data associated with the non-anchor images is retrieved from the memory without dropping any further lines thereof.

12. The apparatus of claim 9, wherein:

said successive digital video images are received at the decoder via a broadband communication network.

13. The apparatus of claim 9, wherein:

said successive digital video images received at the decoder have an aspect ratio of 4:3; and the data output to the display function has an aspect ratio of 16:9.

14. The apparatus of claim 9, wherein:

every nth line is dropped from the non-anchor images by said decoding-side line dropper; and every nth line is dropped from the anchor images by said display-side line dropper.

15. The apparatus of claim 9, wherein:

said non-anchor images comprise bi-directionally predicted images.

16. The apparatus of claim 9, wherein:

said anchor images comprise at least one of (i) intra-coded images, and (ii) forward predicted images.

\* \* \* \* \*